F. F. BACKSTROM.
PROTECTING DEVICE FOR AUTOMOBILES
APPLICATION FILED NOV. 9, 1912.
1,067,710.
Patented July 15, 1913.
2 SHEETS—SHEET 1.
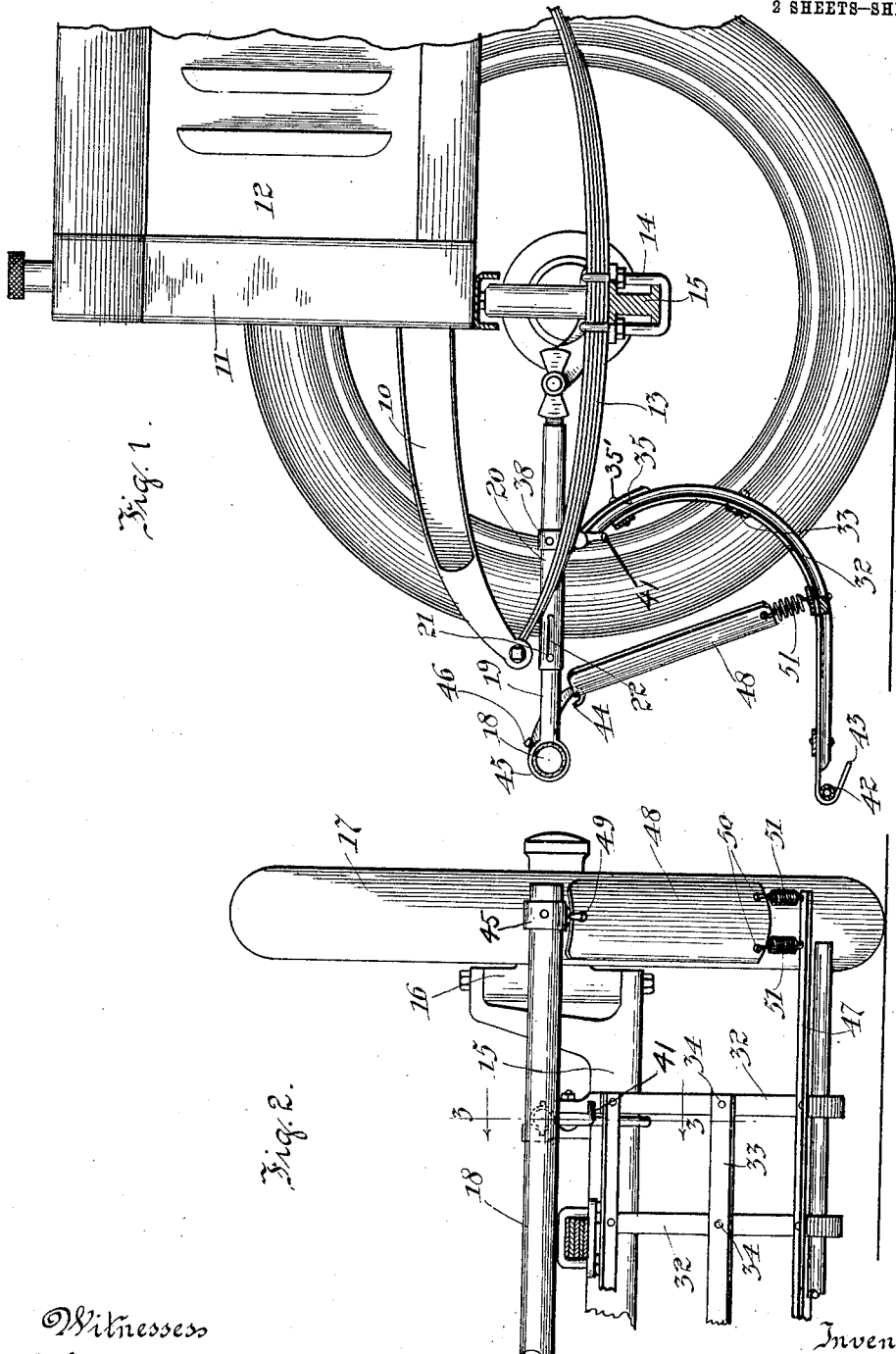

F. F. BACKSTROM.
PROTECTING DEVICE FOR AUTOMOBILES.
APPLICATION FILED NOV. 9, 1912.
1,067,710.
Patented July 15, 1913.
2 SHEETS—SHEET 2.
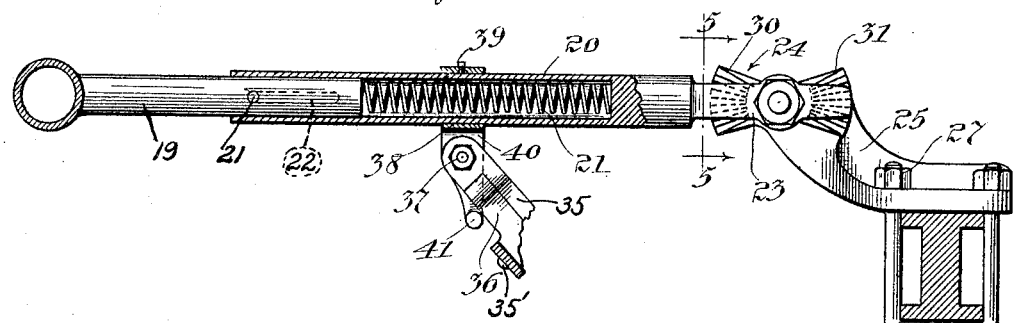
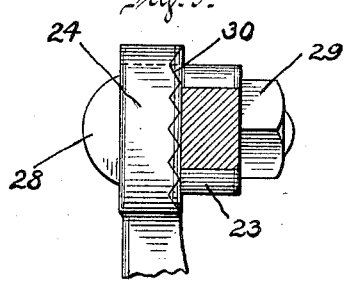
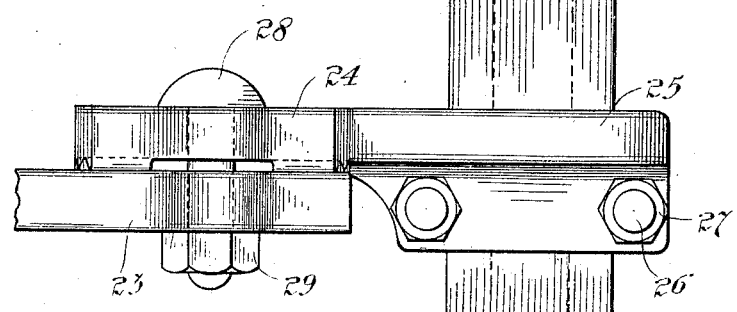

UNITED STATES PATENT OFFICE.

FRIDOLF F. BACKSTROM, OF CHICAGO, ILLINOIS.

PROTECTING DEVICE FOR AUTOMOBILES.

1,067,710. Specification of Letters Patent. Patented July 15, 1913.

Application filed November 9, 1912. Serial No. 730,355.

*To all whom it may concern:*

Be it known that I, FRIDOLF F. BACKSTROM, a citizen of the United States, residing at Chicago, in the county of Cook and State of Illinois, have invented certain new and useful Improvements in Protecting Devices for Automobiles, of which the following is a specification.

My invention relates to improvements in protecting devices for automobiles and like vehicles and more particularly to a structure of this character in which a resilient bumper, an advantageous construction of fender, and suitable shielding screens for the vehicle wheels, are combined in novel and advantageous fashion to provide adequate protection of the automobile from damage by collisions and the like, and equal protection for pedestrians, or animals such as dogs, chickens, and the like, which may be run down by the automobile.

One of the objects of my invention is to provide coöperating parts for effective mutual support, each element being constructed and arranged to be suitably resilient for best accomplishment of its intended function.

Another object of my invention is to provide such coöperating parts with suitable adjusting means whereby the height and inclination of the bumper, and of the fender, may be varied.

Another object of my invention is to provide in such parts means whereby they may readily be attached to any ordinary construction of automobile.

Other and further objects of my invention will become readily apparent to those skilled in the art from a consideration of the description when taken in conjunction with the accompanying drawings, wherein—

Figure 1 is a longitudinal central section through the front portion of an automobile, with the radiator and hood shown in side elevation. Fig. 2 is a front elevation with one side of the device broken away. Fig. 3 is an enlarged section on line 3—3 of Fig. 2; Fig. 4 is a further enlarged plan view of the adjusting means shown in Fig. 3; and Fig. 5 is an enlarged section on line 5—5 of Fig. 3.

While my device is constructed for easy application to any well known automobile, I have herein shown it attached to a conventional type of such vehicle wherein 10 indicates one of the side frames carrying the radiator 11 and hood 12 and connected at its front end to the usual semi-elliptic spring 13 which is secured, as by bracket 14, to the axle 15, said axle being provided with the usual knuckles 16, to support the wheels 17 of the vehicle.

My invention contemplates the use of a resiliently mounted bumper extending in front and transversely of the vehicle at a height approximating that of the axle so that in the event of collision of the automobile with a relatively stationary object, the fragile parts of the automobile, such as the radiator and the lamps carried in front thereof, may not be injured, and in combination with such bumper I provide a fender supported thereby for movement relative thereto and constructed to carry a pedestrian who may be run down by the automobile and prevent such person from being run over or coming in contact with the wheels of the vehicle.

Specifically, 18 indicates a transverse rail, or tube, constituting the bumper bar, provided with two rearwardly extending supporting arms, one of which is shown at 19, resiliently connected to a part of the automobile, as by telescopic engagement in a hollow tubular member 20. Said hollow member 20 contains an open spiral spring 21, which holds the bumper rail 18 in foremost position and yieldingly permits backward movement of the rail, such movement being limited by the engagement of pins 21 in slots 22 in said hollow exterior members. Said tubular member 20 is preferably provided with adjustable means of attachment to the automobile, and I have herein shown a means of adjustable attachment which is particularly advantageous for varying the height and inclination of the bumper, above described, when used in combination with the fender and wheel-shielding devices, to be hereafter described. Said adjustable attaching means includes two perforated and radially grooved coöperating parts, one, indicated at 23, being carried by the member 20, and the other, indicated at 24, being a part of an attaching bracket 25 which is provided with a stirrup clamp 26 and nut 27 adaptable to secure said bracket 25 to any usual construction of vehicle axle. Each of the perforated radially-grooved members 23 and 24 receives in its perforation a bolt 28, which is provided with a nut 29 whereby said coöperating grooved members, the grooves in which radiate from said perforations, may be tightly pressed into engagement, one with the other, in any position to which they have been placed before the nut 29 is tightened. Preferably, each of the members 23 and 24 is provided with a grooved portion on opposite sides of the bolt 28; thus, as best shown in Fig. 3, the grooves in the member 24 are indicated respectively at 30 and 31, and the member 23 has corresponding grooves for interengagement with said grooves 30 and 31, respectively. It will thus be apparent that the bumper is pivotally mounted and is provided with adjustable means for holding it in different positions with respect to height and inclination.

The fender which I have shown in the drawings is constructed for support upon the adjustable members 20 and is shaped to extend from its point of support thereto, downwardly and rearwardly and thereafter forwardly till it reaches a suitable distance above the ground, the fender beyond such point being straight and substantially parallel to the ground. The fender may be conveniently constructed of a series of longitudinal members 32, curved as above indicated, and transverse members 33 connected together as at 34, all of said members being preferably made of strong and durable, but somewhat resilient, metal or other suitable material adapted for use in the construction of a fender. Each of the end members 32 is provided at its top with means for pivotally mounting and supporting the fender upon the member 20, and to this end, each member 32 has a deflected ear 36 at its upper end, and the end of the arm 32 so formed is adapted to fit within a clip 35 which is secured thereto as by bolt 35', the clip 35 being perforated to receive a bolt 37. Upon the member 20 I mount a collar 38, slidable to different positions along the member 20 and adapted to be secured in any adjusted position thereon by set screw 39. Said collar 38 is provided with a downwardly extending perforated portion 40 to receive bolt 37, and said portion 40 also carries at its lowest extremity a stop 41 for engagement with the ear 36 of the fender to limit the pivotal movement thereof, as will be clearly apparent from Fig. 3. At its lower front edge, the fender is provided with a transverse rail or tube 42, and as best shown in Fig. 1 the ends of the strips 32 are bent around said transverse rod 42 and extend downwardly and rearwardly to provide a resilient member 43 for contact with the ground when the fender is borne downwardly by the weight of an object caught by the fender.

In conjunction with the fender above described I provide resilient means to retain it in normal position with the ear 36 in contact with the stop 41 (Fig. 3) and I also provide a shield to prevent any object, caught by the fender, from coming in contact with the vehicle wheels 17. To these and other ends hereafter apparent, I provide at each end of the bumper rail 18 a hook 44, carried by the sleeve 45, which may be adjustably secured upon the end of the rail by means of a set screw 46; said hook preferably extending rearwardly from the collar 45, as best shown in Fig. 1.

Upon the fender I provide a rail 47, substantially as long as the bumper rail 18,—that is, long enough to extend transversely beyond the fender in front of the wheels 17 at each side of the automobile,—and preferably lying in rear of the hook 44. A shield 48 is perforated at its top, as at 49, for engagement with hook 44 and at its bottom has two perforations 50—50 in which engage springs 51—51, the lower ends of which are secured to the rail 47, as best shown in Fig. 2, so that not only is the shield 48 resiliently held in front of the wheels 17, to prevent pedestrians or other objects from coming in contact with and being injured by said wheels when picked up by the fender, but the fender itself is by the same means resiliently held in normal position as shown in Fig. 1. It will further be observed that the parts are so constructed and correlated as to give ample means of adjustment of their relative position. Thus the bumper rail 18 may be raised or lowered by operation of the nut 29 and coacting grooved portions 23 and 24, such adjustment also changing the height of hook 44 and, through the shields 48 and springs 51, having an effect upon the fender, variation of the inclination of member 20 changing the relative position of the stop 41 with respect to the pivotal point 37 of the fender with a consequent effect upon the normal position of the fender. Further, in addition to this adjustment, the collar 38 may be adjusted to different positions along the member 20, in any given position of inclination of said member 20, with a consequent effect upon the tension of springs 51 and upon the position of the shields 48 with respect to the wheels. Thus, with member 20 in a horizontal position as shown in Fig. 1, movement of the collar 38 rearwardly will tend to lengthen springs 51 and draw the shields nearer to the wheels at a greater inclination than shown. Also the hooks 44 may be adjusted by means of set screws 46, to vary the inclination of the shields and the tension of the springs without varying the position of the bumper.

The operation of the device to effect various adjustments of the parts, and its mode of preventing objects from coming into contact with the wheels and from passing under the automobile will be apparent.

While I have herein described a single embodiment of my invention it will be apparent to those skilled in the art that changes may be made in the construction herein shown without departing from the spirit of the invention disclosed and within the scope of the appended claims.

What I claim is:

1. A vehicle attachment comprising a bumper; a fender extending therebelow, and a wheel shield connected to said bumper and fender.

2. A vehicle attachment comprising a bumper; a fender extending therebelow; a wheel shield connected to one of said parts, and resilient means for connecting said wheel shield to the other of said parts.

3. A vehicle attachment comprising an adjustable part for attachment to a vehicle; a resilient bumper for the vehicle mounted upon said adjustable part; a fender, pivotally mounted upon said adjustable part, and resilient connecting means between said bumper and fender.

4. A vehicle attachment comprising an adjustable member for attachment upon a vehicle; a bumper, resiliently mounted upon said adjustable part; a fender, pivotally and adjustably mounted on said adjustable part, and resilient connecting means between said bumper and fender.

5. A vehicle attachment comprising a bumper; means to attach said bumper to a vehicle, including adjustable means to vary the height of said bumper; a fender; means to pivotally support said fender upon a bumper part; an adjustable hook upon the bumper, and resilient connections between said hook and the fender, said connections including a wheel shield.

6. A vehicle attachment comprising a bracket adapted to be secured to the axle of the vehicle, said bracket having a grooved portion; a coöperating grooved part; means to secure said coöperating grooved parts in engagement; a bumper carried by said parts; a fender pivotally and adjustably mounted upon said parts; a hook adjustable upon said bumper; a wheel shield detachably mounted upon said hook, and springs between the lower end of said wheel shield and the fender for the purpose disclosed.

7. A vehicle attachment comprising a bumper; resilient supporting means therefor comprising telescoping parts and a spring; a fender mounted upon one of said telescoping parts; resilient means between said fender and bumper; means to adjustably support said telescoping part with the said fender comprising a perforated and radially grooved portion carried by said telescoping part; a bracket for attachment to a vehicle, provided with a coacting perforated and radially grooved portion, and means extending through said perforation, in said coacting parts, to retain them in any given position of adjustment.

8. A vehicle attachment comprising a bumper rail; a fender; means to attach said bumper and fender in front of an automobile; a hook on said bumper; a wheel shield detachably engaging said hook, and two springs, each attached to the lower edge of said shield and secured to the fender.

In testimony whereof I hereunto set my hand in the presence of two witnesses.

FRIDOLF F. BACKSTROM.

In the presence of—
O. F. SCHULTZ,
H. F. SCHULTZ.

---

Copies of this patent may be obtained for five cents each, by addressing the "Commissioner of Patents, Washington, D. C."